United States Patent
Daijavad et al.

(10) Patent No.: US 9,838,108 B2
(45) Date of Patent: Dec. 5, 2017

(54) IP BASED REAL-TIME COMMUNICATIONS OVER A MOBILE NETWORK

(71) Applicant: International Business Machines Corporation, Armonk, NY (US)

(72) Inventors: Shahrokh Daijavad, Morgan Hill, CA (US); Bijan Davari, Mahopac, NY (US); Brian P. Naughton, Reading (GB); Dinesh C. Verma, New Castle, NY (US)

(73) Assignee: International Business Machines Corporation, Armonk, NY (US)

(*) Notice: Subject to any disclaimer, the term of this patent is extended or adjusted under 35 U.S.C. 154(b) by 16 days.

(21) Appl. No.: 14/743,224

(22) Filed: Jun. 18, 2015

(65) Prior Publication Data
US 2016/0373487 A1    Dec. 22, 2016

(51) Int. Cl.
*H04B 7/26* (2006.01)
*H04L 29/06* (2006.01)
*H04W 64/00* (2009.01)
*H04W 76/02* (2009.01)

(52) U.S. Cl.
CPC ........ *H04B 7/2606* (2013.01); *H04L 65/1006* (2013.01); *H04W 64/003* (2013.01); *H04W 76/023* (2013.01)

(58) Field of Classification Search
CPC .................................................. H04B 7/2606
See application file for complete search history.

(56) References Cited

U.S. PATENT DOCUMENTS

| | | | | |
|---|---|---|---|---|
| 6,707,813 B1 * | 3/2004 | Hasan | ................ | H04L 12/4633 370/328 |
| 2005/0286466 A1 | 12/2005 | Tagg et al. | | |
| 2008/0171548 A1 * | 7/2008 | Tsirtsis | .................... | H04W 8/04 455/437 |

(Continued)

FOREIGN PATENT DOCUMENTS

| | | |
|---|---|---|
| JP | 2004304386 A | 10/2004 |
| JP | 2007235638 A | 9/2007 |

(Continued)

OTHER PUBLICATIONS

Behrens et al., "Knowledge-Based Mobile Remote Engineering for Maintenance Processes", 2012 IEEE 17th Conference on Emerging Technologies & Factory Automation (ETFA), pp. 1-7. IEEE, Sep. 2012.

(Continued)

*Primary Examiner* — Jason Mattis
(74) *Attorney, Agent, or Firm* — Jennifer R. Davis; Michael J. Chang, LLC (57) ABSTRACT

Techniques for improving real-time communications over a mobile network are provided. In one aspect, a method for managing data transfer in a mobile network wherein user equipment transmit data through one or more cell towers is provided. The method includes the steps of: intercepting data packets from the user equipment; determining a location of a given one of the cell towers in the mobile network to which the data packets are to be sent; and tunneling the data packets directly to the given cell tower. A system for managing data transfer in a mobile network wherein user equipment transmit data through one or more cell towers is also provided.

18 Claims, 5 Drawing Sheets

(56) References Cited

U.S. PATENT DOCUMENTS

| | | |
|---|---|---|
| 2008/0248792 A1 | 10/2008 | Gundu |
| 2009/0215455 A1* | 8/2009 | De Jaeger ............. H04W 84/14 455/435.1 |
| 2010/0014494 A1* | 1/2010 | Schmidt ............. H04W 88/085 370/338 |
| 2010/0202368 A1 | 8/2010 | Hans |
| 2011/0058556 A1 | 3/2011 | He |
| 2012/0044908 A1 | 2/2012 | Spinelli et al. |
| 2012/0243478 A1 | 9/2012 | Nielsen et al. |
| 2013/0178192 A1 | 7/2013 | McDonald et al. |
| 2013/0337801 A1* | 12/2013 | Yi ......................... H04W 80/10 455/426.1 |
| 2015/0256984 A1* | 9/2015 | Patel ....................... H04W 4/10 455/416 |
| 2015/0296392 A1* | 10/2015 | Chen ..................... H04W 16/00 370/328 |
| 2016/0065384 A1* | 3/2016 | Byun .................. H04L 12/4633 370/401 |

FOREIGN PATENT DOCUMENTS

| | | |
|---|---|---|
| JP | 2008072203 A | 3/2008 |
| WO | WO2009084967 A1 | 7/2009 |

OTHER PUBLICATIONS

Kataria et al., "Fixed Mobile Convergence: Network architecture, Services, Terminals, and Traffic Management", IEEE 16th International Symposium on Personal, Indoor and Mobile Radio Communications, 2005 (PIMRC 2005), vol. 4, pp. 2289-2300. IEEE, Sep. 2005.

English Abstract of Japanese Patent Application JP2007235638A by Tera Hideo; NEC infrontia, Sep. 13, 2007.

English Abstract of Japanese Patent Application JP2008072203A by Tanimoto Yoshifumi; Murata Machinery Mar. 27, 2008.

English Abstract of Japanese Patent Application JP2004304386A by Kimura Toru et al; Japan Telecom Co. Oct. 28, 2004.

* cited by examiner

Device at Cell Tower

IP BASED REAL-TIME COMMUNICATIONS OVER A MOBILE NETWORK

FIELD OF THE INVENTION

The present invention relates to techniques for managing data transfer in a mobile network, and more particularly, techniques for improving real-time communications over a mobile network by intercepting and tunneling data packets directly to a recipient.

BACKGROUND OF THE INVENTION

Real-Time Communication refers to the downloading of streaming video or audio media to a browser from a website, or an interactive voice, video, or multimedia communication that happens among two or more parties. Such communication happens between two computers in an internet protocol (IP) network, and may be conducted over a protocol such as Session Initiation Protocol (SIP) using Real-time Transfer Protocol (RTP), or over HyperText Markup Language (HTML) using the Web Real-Time Communication (WebRTC) specifications. With the advent of mobile phones, such services are also expected to occur on the mobile networks carrying IP traffic.

In a wired IP network, techniques such as peer-to-peer communication for RTP or WebRTC allow an efficient communication of bandwidth-intensive data between two peers, bypassing the need to go to a server (which mainly handles signaling aspects). However, in a mobile network, peer-to-peer communication over IP networks is inefficient because the design of the cellular network causes even peer-to-peer traffic to go over congested links twice. Thus, schemes like WebRTC or peer-to-peer RTP do not provide any quality gains for mobile users.

Accordingly, techniques for improved IP-based real-time communication over a mobile network would be desirable.

SUMMARY OF THE INVENTION

The present invention provides techniques for improving real-time communications over a mobile network by intercepting and tunneling data packets directly to a recipient. In one aspect of the invention, a method for managing data transfer in a mobile network wherein user equipment transmit data through one or more cell towers is provided. The method includes the steps of: intercepting data packets from the user equipment; determining a location of a given one of the cell towers in the mobile network to which the data packets are to be sent; and tunneling the data packets directly to the given cell tower.

In another aspect of the invention, a system for managing data transfer in a mobile network wherein user equipment transmit data through one or more cell towers is provided. The system includes SIP servers located at one or more of the cell towers in the mobile network, wherein the SIP servers are configured to intercept data packets from the user equipment, and determine a location of a given one of the cell towers in the mobile network to which the data packets are to be sent; and tunneling systems located at one or more of the cell towers in the mobile network, wherein the tunneling systems are configured to tunnel the data packets directly to the given cell tower.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for improved internet protocol (IP)-based real-time communication over a cellular network wherein edge computing paradigms are used to enable an efficient peer-to-peer communication for real-time communication on IP networks. Namely, as will be described in detail below, the present techniques employ a Session Initiation Protocol (SIP) server or a control server at the edge of the mobile network. This server intercepts the signaling and data path of a communication before it reaches the bottleneck link. The server then tunnels the data traffic through to the other peering point in an optimal manner without requiring the communication to cross multiple times over a congested link.

Figure 1:
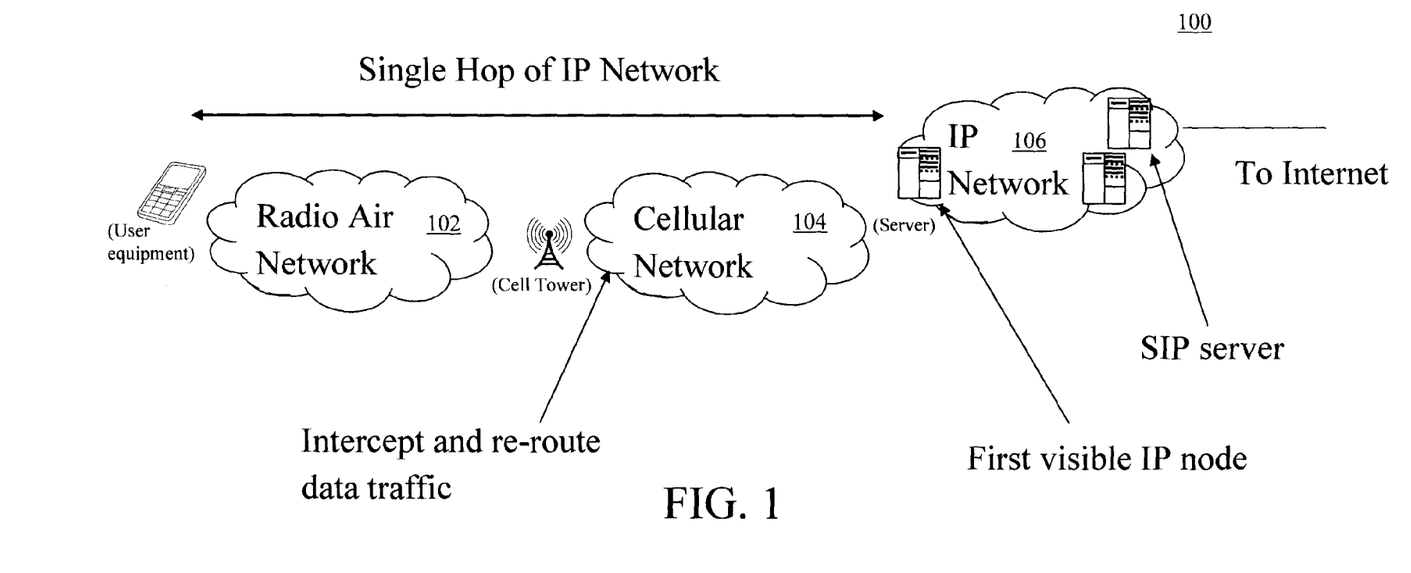
FIG. 1 is a diagram illustrating an exemplary mobile network according to an embodiment of the present invention.

FIG. 1 is a diagram illustrating an exemplary mobile network 100 which provides the framework for the present techniques. As shown in FIG. 1, the mobile network 100 (which may be operated by a large network operator) consists of three segments: a radio air network 102 (or also simply a radio network), a cellular network 104, and an internet protocol (IP) network 106. The radio network connects user equipment (e.g., mobile devices, mobile telephones, personal digital assistants (PDAs), personal computers (PCs), laptop computers, etc.) to one or more cell towers. Each of the cell towers typically contain a base station that transmits data (obtained wirelessly from the user equipment) to the core network. A mobile network, such as mobile network 100, is typically distributed over different geographical areas, often referred to as cells. Each cell is served by at least one cell tower. Thus user equipment within the same cell might be associated with the same cell tower (and base station), while users in different cells might be associated with different cell towers/base stations. As described in detail below, one goal of the present techniques is to make peer-to-peer data transfer between user equipment associated with the same or different cell towers more efficient as compared to conventional peer-to-peer data transfer protocols.

The cellular network connects the base stations to the IP network. The radio network and the cellular network are at the edge of mobile network 100, while the IP network is at the core of mobile network 100.

In general, the cellular network is invisible to the operator of the IP network. Namely, as shown in FIG. 1, the cellular network typically appears only as a single end hop of a layer 2 link (i.e., the Data Link layer) from the user equipment to the IP network. In conventional scenarios, a SIP server or a web-server for Web Real-Time Communication (WebRTC), can only be located in the IP network, or on the Internet. For illustrative purposes only, a SIP server is shown in the IP/core network in FIG. 1.

Similarly, the end-hop of the IP network from the user equipment is typically only on the IP network, i.e., the (e.g., SIP) server in the IP network is the first node visible to the user equipment. See FIG. 1. As a result of this, any information sent from one user equipment to another (such as from one mobile telephone to another mobile telephone) crosses over the mobile network twice, even if the two telephones are connected to the same cell tower. This design is inefficient because this peer-to-peer traffic has to pass over often congested links twice. By contrast, in accordance with the present techniques a SIP or control server is placed at the edge of the mobile network (such as at one or more of the cell towers) to intercept communications and tunnel data traffic through to another peering point. See FIG. 1

From a logical layering perspective, mobile (i.e., cellular) networks are generally implemented on an underlay network, which can be either an IP or Asynchronous Transfer Mode (ATM) network, with IP networks being more common. For instance, the nodes of a peer-to-peer network often run on top of the Internet. As a result, the logical layering of the present mobile network is as shown in FIG. 2.

Figure 2:
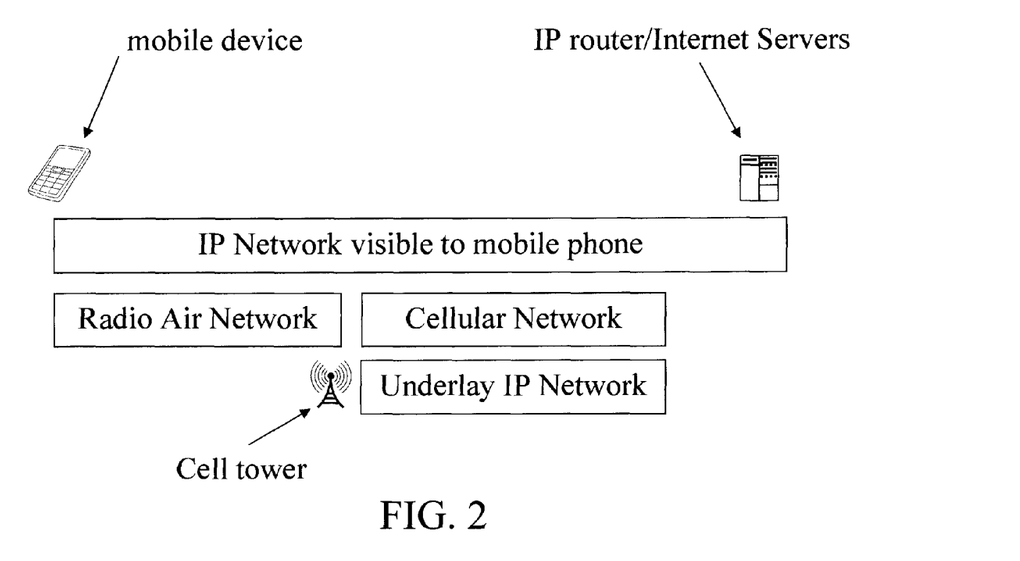
FIG. 2 is a diagram illustrating the logical layering of the present mobile network according to an embodiment of the present invention.

As shown in FIG. 2, the cellular network runs on top of an underlay IP network. The IP network visible to the user equipment (labeled "mobile device" in this example) is overlaid on top of the radio air network and the cellular network. Thus, the cellular network is just a single IP hop away in the IP network visible to the mobile phone. For reference, see radio air network 102, cellular network 104 and IP network 106 in FIG. 1. IP routers serve to route data traffic to/from the user equipment over the IP network visible to the mobile phone.

Because of this structuring of the network, with conventional protocols any communication between two mobile devices on the network has to go at least twice over the mobile network. Thus, even if the two mobile devices (i.e., a first mobile device and a second mobile device) are associated with the same cell tower (and base station), the data traffic would still have to go once over from the first mobile device to the first visible IP router, and then come back from that IP router to the second mobile device, passing each time through the often congested radio air network and cellular network (a visible IP router in this case is defined as a router which can be seen by the applications running on user-equipment or the server in the Internet it can connect to—a router in the underlay IP network is not visible to the end-user). This is an inefficient approach for data exchange. If the mobile devices are in different cells (and thus associated with different cell towers/base stations), then traffic would need to go across more IP routers to go to the second mobile device.

Given the existence of an underlay network, it has advantageously been found in accordance with the present techniques that it is possible to design a better path for peer-to-peer communication which does not require going all the way into the IP network. Specifically, according to an exemplary embodiment, intercepting/tunneling applications are provided at one or more of the cell towers (e.g., at each of the cell towers)—see, e.g., FIG. 4, described below. These applications intercept the data packets from the mobile device and theft determine the location of the second cell-tower where the packets ought to be sent. The application would then tunnel the packets to the second device at the second cell-tower using this tunnel—for example via the underlay IP network. The tunnel technique can be Generic Routing Encapsulation (GRE) between two cell towers, or any other tunneling scheme.

Generally, GRE is a tunneling protocol that can be used to encapsulate network layer protocols inside virtual point-to-point links over an IP network. The two ends of a GRE tunnel are defined by a source IP address and a destination IP address. See, for example, U.S. Patent Application Publication Number 2011/0058556 by He, entitled "Generic Routing Encapsulation Bearing Method, Apparatus and System," the contents of which are incorporated by reference as if fully set forth herein.

Figure 3:
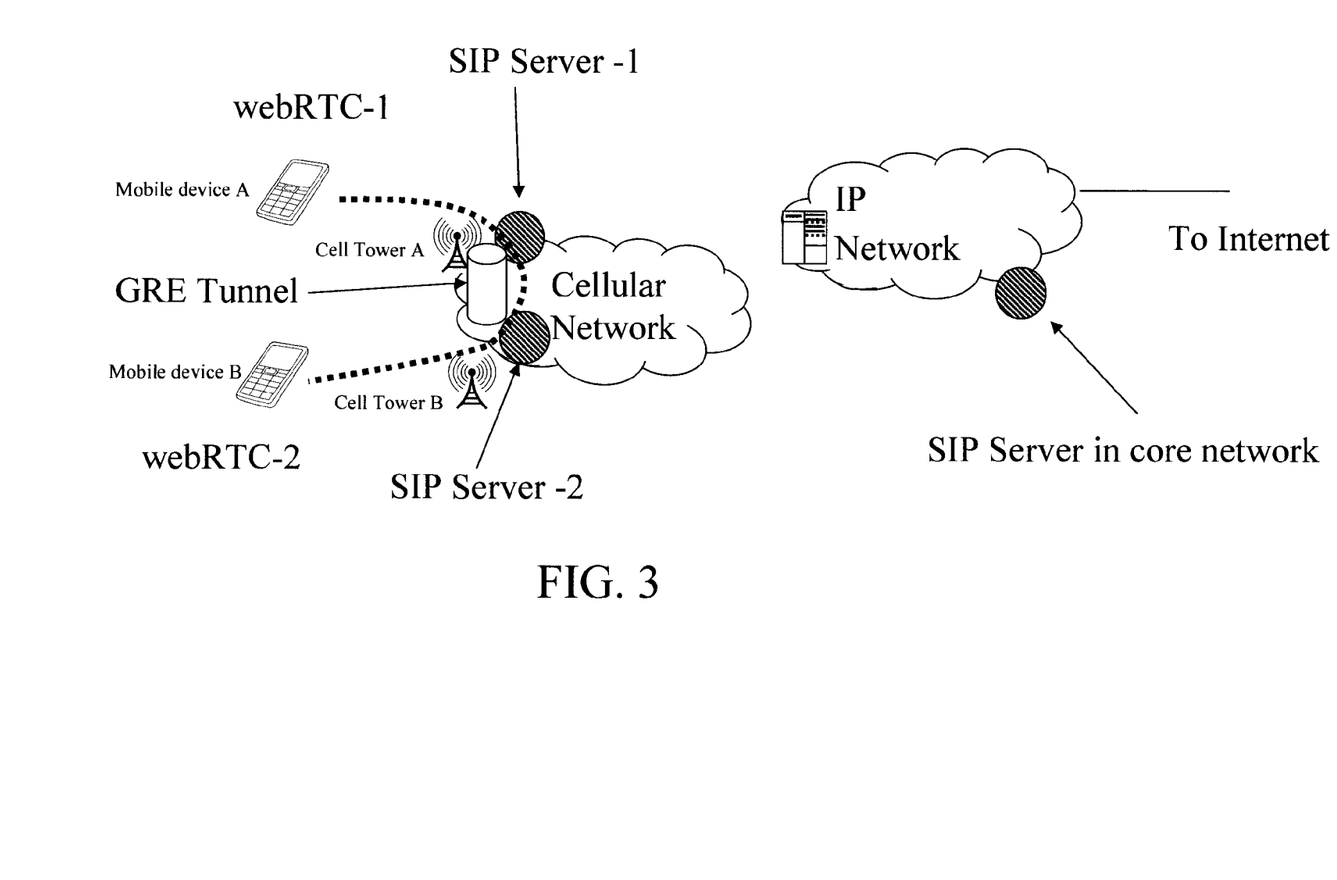
FIG. 3 is a diagram illustrating the present techniques for managing data transfer in a mobile network using a generic routing encapsulation (GRE) tunneling scheme according to an embodiment of the present invention.

An exemplary embodiment of the present techniques implementing a GRE tunneling scheme is shown illustrated in FIG. 3. For ease and clarity of depiction, the example shown in FIG. 3 involves the communication between two mobile devices (mobile device A and mobile device B) via two cell towers (cell tower A and cell tower B), respectively. However, the same approach can be applied to scenarios having more than one tunnel that is established in the environment. It is notable that if the mobile devices (such as mobile device A and mobile device B) are instead both within the same cell (i.e., and connected to the same cell tower) then one of two schemes can be used: (a) an internal loopback GRE can be employed that loops back the data packets to an instance of the same SIP server or another SIP server on the cell tower (in general one may have more than one SIP server on the same cell tower); or (b) if the two mobile devices are connected to the same SIP server, then the SIP server can simply send the data packets to the receiving user.

In FIG. 3, data transfer between the first mobile device A and the second mobile device B is indicated with a dashed line. In this example, a SIP server is located at each of the cell towers in the cellular network. See, for example, SIP Server-1 and SIP Server-2 located at Cell Tower A and Cell Tower B, respectively. By comparison, as provided above, in conventional data transfer protocols SIP servers are located only in the core IP network.

Data communication occurs between Mobile Device A and Cell Tower A. However, instead of transferring the data packet from Mobile Device A to the IP network, the SIP Server-1 (located at Cell Tower A) intercepts the data packets from Mobile Device A. The SIP server then determines a location of a second cell tower in the mobile network to which the data packets are to be sent (i.e., Cell Tower B in this example), and passes the data packets from Mobile Device A to a GRE tunneling system which puts the packets into a GRE tunnel and sends the data packets directly to SIP Server-2 at Cell Tower B. Cell Tower B can then transmit the data packets directly to Mobile Device B via the underlay IP network. Determining the location of the cell tower in the mobile network to which the data packets are to be sent can be done in a variety of ways. In many cellular network architectures, the IP addresses to user-equipment are assigned depending on the cell-tower they are assigned to. A mapping of IP address ranges to the cell-tower can be defined at different SIP servers and used to determine the locations. Alternatively, a special server that provides location mapping from IP addresses to cell-towers can be used, where this server is configured to have this mapping information. Some cellular networks assign IP addresses dynamically across different cell-stations, and usually have a server which maintains the mapping between IP address and cell-towers. This server can be looked up to determine the mapping.

As the locations of the users change, the corresponding end-points for communication can also be changed and modified. Using the scenario in FIG. 3 as an example, Mobile device B may change its location (i.e., and may no longer be associated with Cell Tower B). In that case adjustments to the destination IP-address can be made by the SIP server. The adjustment involves determining the current cell-tower location of the mobile device, which can be done by performing the determination process for every IP data packet, at periodic times, or upon specific events, e.g., when the data packets sent to a previous address results in an error notification because the network is unable to deliver the data packets to the previous destination. In this example, the sending SIP Server-1 would change the destination IP-address when the receiving SIP server changes.

Figure 4:
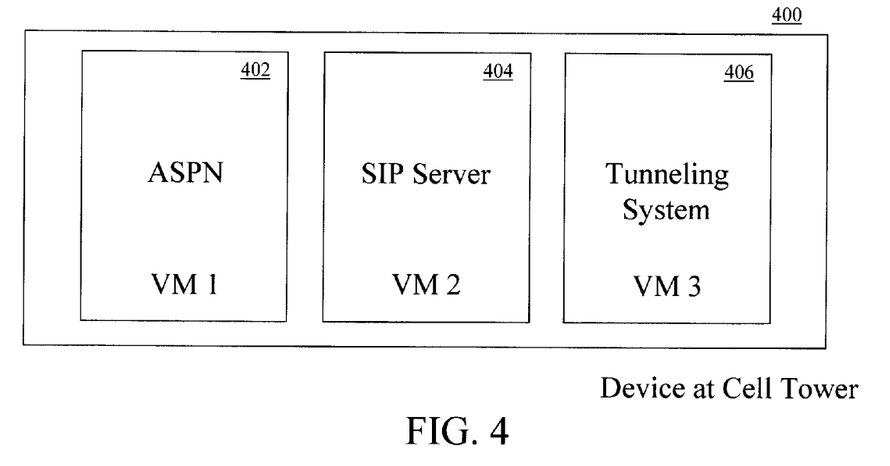
FIG. 4 is a diagram of an exemplary system for managing data transfer in a mobile network, such as the mobile network of FIG. 1, according to an embodiment of the present invention.

According to an exemplary embodiment, the SIP server and GRE tunneling application are part of a system of virtual machines (VM) located at each of the cell towers in the mobile network. See, for example, FIG. 4. FIG. 4 is a diagram of an exemplary system 400 for managing data transfer in accordance with an exemplary embodiment of the present techniques. By way of example only, system 400 may be located at one or more (e.g., at each) of the cell towers in mobile network 100 or FIG. 1. In this particular example, each system 400 is run on an Application Service Platform for Networks (ASPN) platform. Namely, each system 400 includes an ASPN node 402, in conjunction with a virtual machine (VM) that runs a SIP server 404 terminating Web-RTC connections. The SIP server 404 is augmented with a Tunneling System 406 which can be used to drive data packets within the underlay IP network used in the cellular infrastructure (see, for example, FIG. 2—described above). In the example shown in FIG. 4, the SIP server 404, and the Tunneling System 406 are shown in two independent virtual machines, i.e., VM 2 and VM 3, respectively. ASPN, available from International Business Machines Corporation, is a mobile edge computing platform that can run applications directly within a mobile base station. In this example, ASPN provides the infrastructure to run the SIP server and the Tunneling software. ASPN is essentially a software based web-server plus a few other functions. Like any other software based server, it can be packaged into a virtual machine (VM). The ASPN 402 in each system 400 may also be referred to herein as an ASPN node. Via the tunneling system 406, the data packets are routed to the correct receiving. ASPN node—which will be the ASPN node associated with the system 400 at the cell tower to which the data packets are to be sent.

Namely, when data packets are received from the user equipment at the cell tower, the SIP server 404 intercepts the data packets and passes the data packets to the Tunneling System 406. The Tunneling System 406 then puts the data packets into a tunnel which can send them to the desired ASPN node to be received and relayed forward via the underlay IP network (e.g., in the case where the location of the user has changed, the tunneling system can keep track of the current location of the user).

Figure 5:
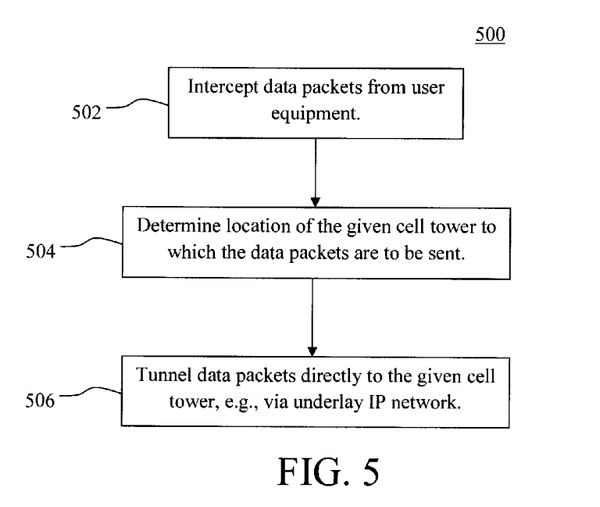
FIG. 5 is a diagram illustrating an exemplary methodology for managing data transfer in a mobile network, such as the mobile network of FIG. 1, according to an embodiment of the present invention.

Given the above description of the present techniques, an exemplary methodology 500 for managing data transfer in a mobile network (such as mobile network 100 of FIG. 1) is now described by way of reference to FIG. 5. Methodology 500 may be performed, for example, by the above-described system 400 (located, for example, at each of the cell towers in the mobile network 100).

In step 502, data packets (e.g., as part of a Web-RTC communication) are intercepted from user equipment (e.g., from mobile devices). As described in detail above, the data packets may be sent from a first mobile device (e.g., Mobile device A) to a second mobile device (e.g., Mobile device B). In accordance with the present techniques, the mobile devices may be within the same cell, or in different cells, and thus associated with the same or different cell towers in the mobile network.

In step 504, a location of the given cell tower to which the data packets are to be sent is determined. In step 506, the data packets are tunneled directly to the given cell tower in the mobile network. As described in detail above (see, for example, FIG. 2), the mobile network can include a radio network and a cellular network through which the user equipment communicate with an IP network. The cellular network can be run on top of an underlay IP network, and in step 506 the data packets can be tunneled directly to the given cell tower via the underlay IP network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
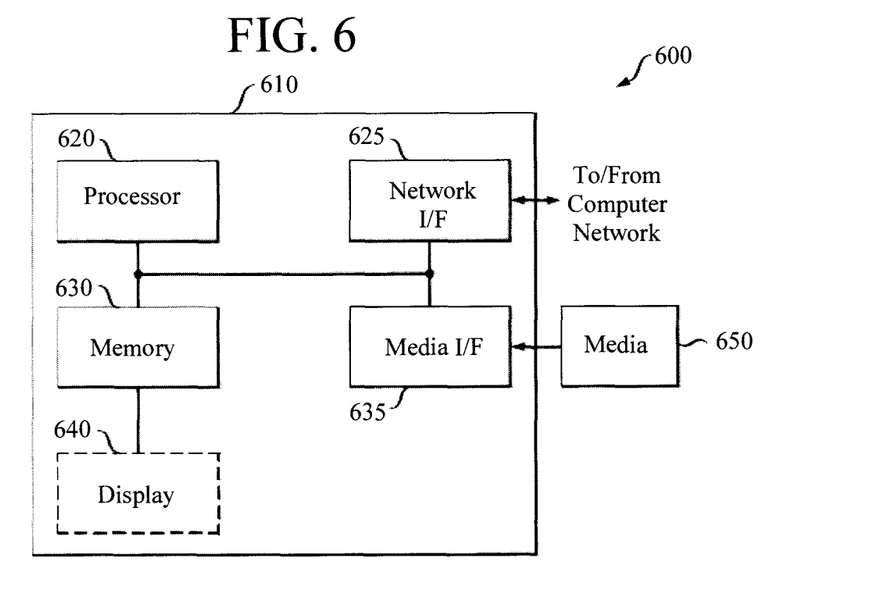
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 500 of FIG. 5.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for managing data transfer in a mobile network wherein user equipment transmit data through one or more cell towers, the method comprising the steps of:
   providing Session Initiation Protocol (SIP) servers and tunneling systems located at one or more of the cell towers in the mobile network running applications for intercepting and tunneling data packets at an edge of the mobile network;

intercepting the data packets from the user equipment at the one or more cell towers using the SIP servers, and passing the data packets to the tunneling systems;

determining a location of a given one of the cell towers in the mobile network to which the data packets are to be sent using destination addresses provided by the tunneling systems which keep track of a current location of the user equipment; and tunneling the data packets directly to the given cell tower using the tunneling systems which put the data packets into tunnels that lead directly to the given cell tower.

2. The method of claim 1, wherein the user equipment comprises one or more of mobile devices, mobile telephones, personal digital assistants (PDAs), personal computers (PCs), and laptop computers.

3. The method of claim 1, wherein the data packets are being sent from a first mobile device to a second mobile device.

4. The method of claim 3, wherein the first mobile device is associated with a first one of the cell towers in the mobile network and the second mobile device is associated with a second one of the cell towers in the mobile network.

5. The method of claim 3, wherein the first mobile device and the second mobile device are both associated with a same cell tower in the mobile network, the method further comprising the step of:

looping back the data packets to the same cell tower.

6. The method of claim 1, wherein the SIP servers are located at each of the cell towers in the mobile network.

7. The method of claim 1, wherein the tunneling systems are located at each of the cell towers in the mobile network.

8. The method of claim 1, wherein the mobile network comprises a radio network and a cellular network through which the user equipment communicate with an internet protocol (IP) network, and wherein the cellular network runs on top of an underlay IP network, the method further comprising the step of:

tunneling the data packets directly to the given cell tower via the underlay IP network.

9. The method of claim 1, wherein the data packets are from a Web Real-Time Communication (WebRTC).

10. A system for managing data transfer in a mobile network wherein user equipment transmit data through one or more cell towers, comprising:

SIP servers and tunneling systems running applications for intercepting and tunneling data packets at an edge of the mobile network located at one or more of the cell towers in the mobile network, wherein the SIP servers are configured to intercept the data packets from the user equipment at the one or more cell towers, and pass the data packets to the tunneling systems, and determine a location of a given one of the cell towers in the mobile network to which the data packets are to be sent using destination addresses provided by the tunneling systems which keep track of a current location of the user equipment, and wherein the tunneling systems are configured to tunnel the data packets directly to the given cell tower by putting the data packets into tunnels that lead directly to the given cell tower.

11. The system of claim 10, wherein the SIP servers are located at each of the cell towers in the mobile network.

12. The system of claim 10, wherein the tunneling systems are located at each of the cell towers in the mobile network.

13. The system of claim 10, wherein the mobile network comprises a radio network and a cellular network through which the user equipment communicate with an IP network, wherein the cellular network runs on top of an underlay IP network, and wherein the tunneling systems are configured to tunnel the data packets directly to the given cell tower via the underlay IP network.

14. The system of claim 10, wherein the SIP servers and the tunneling systems are run on an Application Service Platform for Networks (ASPN) platform.

15. The system of claim 10, wherein the data packets are being sent from a first mobile device to a second mobile device.

16. The system of claim 15, wherein the first mobile device is associated with a first one of the cell towers in the mobile network and the second mobile device is associated with a second one of the cell towers in the mobile network.

17. The system of claim 15, wherein the first mobile device and the second mobile device are both associated with a same one of the cell towers in the mobile network.

18. A computer program product for managing data transfer in a mobile network wherein user equipment transmit data through one or more cell towers, the computer program product comprising a computer readable storage medium having program instructions embodied therewith, the program instructions executable by a computer to cause the computer to:

provide SIP servers and tunneling systems located at one or more of the cell towers in the mobile network running applications for intercepting and tunneling data packets at an edge of the mobile network;

intercept the data packets from the user equipment at the one or more cell towers using the SIP servers, and passing the data packets to the tunneling systems;

determine a location of a given one of the cell towers in the mobile network to which the data packets are to be sent using destination addresses provided by the tunneling systems which keep track of a current location of the user equipment; and tunnel the data packets directly to the given cell tower using the tunneling systems which put the data packets into tunnels that lead directly to the given cell tower.

* * * * *